Nov. 23, 1926.
S. J. BEEBE
WORK HOLDER
Filed Feb. 18, 1926
1,608,293
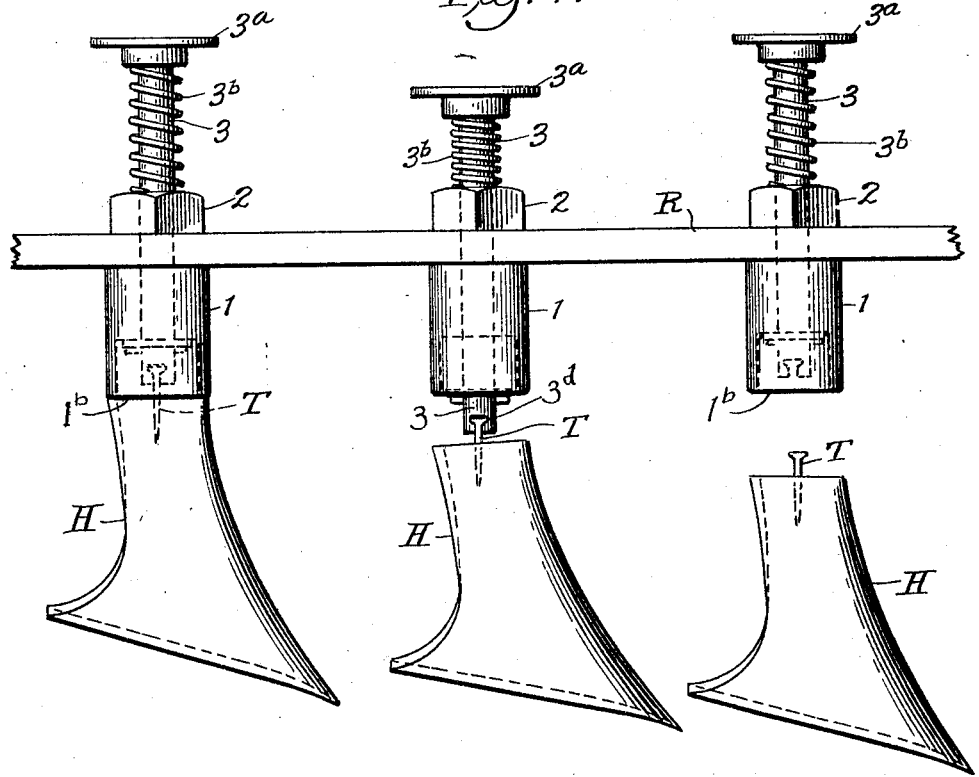
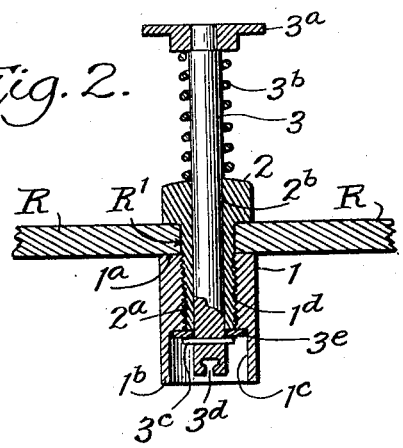
Inventor
Stanley J. Beebe
By Alexander Powell
Attorneys Patented Nov. 23, 1926.

1,608,293

UNITED STATES PATENT OFFICE.

STANLEY J. BEEBE, OF ENDICOTT, NEW YORK, ASSIGNOR TO ENDICOTT JOHNSON CORPORATION, OF ENDICOTT, NEW YORK, A CORPORATION OF NEW YORK.

WORK HOLDER.

Application filed February 18, 1926. Serial No. 89,210.

This invention is an improvement in work holders, and the principal object thereof is to provide a novel, simple, and efficient holder for articles such as heels, or the like, while they are being dipped into vats containing enamel, paint, and the like, the device maintaining the heels or other articles firmly in position with the upper surfaces of the heels or other articles level with the surface of the coating liquid in the enamel vat, which is important for the reason that when the heels are dipped into the enamel the outer or tread surfaces of the heels should be flush with the surface of the enamel, so that same will not be covered with the enamel; also, as the heels are being lifted out of the enamel all portions of the lower or tread faces should leave the enamel at the same time in order that no ridges will appear around the edges of the heel. A plurality of my novel work holders such as are shown in the drawing are attached to a frame or rack and the frame is then placed on the ledges of the elevator of the enameling machine, so that the frame will be horizontal, thereby insuring the dipping of all the heels at the same time, and also that they will be lifted from the enamel at the same time.

My novel work holders may be used for holding any other articles besides heels into which nails may be driven the holders maintaining such articles so that the upper surfaces thereof will be flush or parallel with the surface of the enameling fluid when the articles are dipped to proper depth, so that the enamel will not flow over their upper surfaces.

I will explain the invention with reference to the accompanying drawing which illustrates one practical embodiment thereof to enable others to adopt and use the same, and will summarize in the claims the novel features of construction, and novel combination of parts for which protection is desired.

In said drawings:

Fig. 1 is a side elevation of a portion of a conventional elevator frame having applied thereto a plurality of my novel work holders, showing the holders and heels in different engagements or positions.

Fig. 2 is a vertical section through one of the work holders.

As shown in the drawing, each work holder consists of a body member 1 of any desired shape or form, whether cylindrical, rectangular, or otherwise, and of desired length, the same being made of any desired material, although preferably of metal. The upper end $1^a$ of the body 1 is preferably cut or otherwise formed perpendicular to the longitudinal axis of the body, and the lower end $1^b$ of the body is likewise so cut or formed. In the lower end of the body 1 is a recess $1^c$, preferably cylindrical, and of suitable diameter and depth, the recess $1^c$ being preferably of a diameter slightly less than that of the body 1, and coaxial with the body.

Extending longitudinally and coaxially of the body is a bore $1^d$ communicating with the recess $1^c$, the bore $1^d$ being preferably tapped and adapted to receive the threaded shank $2^a$ of a bolt 2 which shank is preferably slightly longer than the tapped bore $1^d$, as shown in Fig. 2, and the bolt being adapted to clamp the body 1 to the frame R.

Extending longitudinally through the bolt and shank, coaxially thereof, is a bore $2^b$ adapted to receive a plunger 3, carrying on its upper end an enlarged or disk-shaped head $3^a$ by which the plunger may be depressed, and around the plunger 3 interposed between the bolt 2 and the head $3^a$ is coiled a spring $3^b$ for normally maintaining the plunger in raised position.

The lower end of plunger $3^a$ extends down into the recess $1^c$ of body 1, and a cotter pin $3^c$ or the like transfixes the plunger adjacent its lower end to prevent the plunger from being forced up through the bolt 2 by the spring $3^b$. In the lower end of plunger 3 is a T-slot $3^d$ adapted to receive the head of a tack, screw, nail, or the like, for the purpose hereinafter explained. If desired a suitable washer $3^e$ may be interposed on the plunger 3 between the cotter pin $3^c$ and the body 1, the washer being of smaller diameter than that of the recess $1^c$.

In practice, any number of the above described holders or supports may be attached to frames R which may be placed on the shelves or ledges of the usual elevating device (not shown) of the enameling machine which lowers the articles to be enameled into the enameling vat (not shown) and raises same after immersion in the usual manner.
In the drawing, Fig. 1, I have illustrated the articles to be enameled as being women's "French" heels, although I do not restrict the use of my invention to heels.

The frames R are adjusted horizontally to the proper levels, and the work holders are secured to the racks R by removing the bolts 2 and inserting the shanks $2^a$ down through perforations R' in the racks, and re-engaging the bolts 2 with the body portions 1, and turning the bolts 2 to tightly clamp the racks R between the bolts and the upper ends $1^a$ of the body portions 1. If the racks R have been adjusted horizontally then the lower faces $1^b$ of the body portions 1 will be parallel with the enameling fluid.

In order to attach a heel H to the work holder, a screw, nail, or tack T is partly driven into the center of the tread surface thereof as shown at the right in Fig. 1. The plunger 3 should then be depressed and the head of the tack T inserted in the T-slot $3^d$ in the end of the plunger as shown in the center of Fig. 1. Upon releasing the plunger the heel will be drawn upwards by spring $3^b$ until the tread surface of the heel will contact with the lower face $1^b$ of body 1, and will be firmly held parallel with the surface of the enamel in the vat as shown at the left in Fig. 1. This feature is important for the reason that when the heel is dipped into the enamel until the outer or tread surface of the heel is flush with the surface of the enamel, that the tread surface will not be covered with enamel, and as the heel is being lifted out of the enamel all portions of the tread surface of the heel should leave the enamel at the same time, in order that no ridges of enamel will appear around the edges of the heel. The body 1 may be made in various shapes to suit the contour of the articles to be enameled.

The use of my invention permits the dipping of a number of heels by the same frame at the same time and insures that all the heels on each frame will be dipped and lifted out of the enamel at the same time, resulting in a uniform product.

I do not limit my invention to use with the specific heels above mentioned and shown in the drawings, for obviously the holders may be used in enameling any other articles into which tacks, screws, or the like may be driven. Nor do I limit my invention to the exact form shown in the drawing for changes may be made therein within the scope of the claims.

I claim:
1. A work holder comprising a body portion having a recess, and a bore communicating with the recess; said bore being tapped; a member threaded into said tapped bore, and having a bore therein adapted to receive a plunger; a plunger in the bore, said plunger having a slot in one end; and means for yieldingly maintaining the slotted end of the plunger within the recess.

2. A work holder comprising a body portion having a recess and a tapped bore communicating with the recess; means for mounting the body on a support comprising a threaded member adapted to enter said tapped bore and having a bore extending therethrough adapted to receive a plunger; a plunger in said bore having a slot in one end; said plunger extending beyond the member; a head on the outer end of said plunger; a spring interposed between the member and head; and means for limiting the movement of the plunger by said spring.

3. A work holder comprising a body portion having a recess in its lower end, and having a bore tapped extending through the body portion and communicating with the recess; a threaded member adapted to enter said tapped bore, and having a bore extending therethrough adapted to receive a plunger; a plunger in said bore, having a slot in its lower end; and means for yieldingly maintaining the lower end of the plunger within the recess.

4. In a work holder as set forth in claim 3, said plunger extending beyond the body; a head on the outer end of said plunger; said yielding means comprising a spring interposed between the body and head; and means for limiting the movement of the plunger by said spring.

5. A work holder comprising a body portion having a recess, and a tapped bore communicating with the recess; means for mounting the body on a support comprising a bolt adapted to enter said tapped bore, and having a bore extending therethrough adapted to receive a plunger; a plunger in said bore having a T-shaped slot in its lower end; the upper end of said plunger extending above the body; a head on the upper end of the plunger; a spring interposed between the body and said head; and means for limiting the movement of the plunger by said spring.

In testimony that I claim the foregoing as my own, I affix my signature.

STANLEY J. BEEBE.